United States Patent
Desai et al.

(10) Patent No.: US 7,167,952 B2
(45) Date of Patent: Jan. 23, 2007

(54) METHOD AND SYSTEM FOR PERFORMING A MEMORY-MODE WRITE TO CACHE

(75) Inventors: Krishna M. Desai, Bangalore (IN);
Anil S. Keste, Bangalore (IN);
Tin-chee Lo, Fishkill, NY (US);
Thomas D. Needham, Poughkeepsie, NY (US); Yuk-Ming Ng, Poughkeepsie, NY (US); Jeffrey M. Turner, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 10/667,235

(22) Filed: Sep. 17, 2003

(65) Prior Publication Data

US 2005/0060494 A1 Mar. 17, 2005

(51) Int. Cl.
*G06F 12/00* (2006.01)

(52) U.S. Cl. ............... 711/118; 711/133; 711/134; 711/138; 711/144; 711/154; 711/156; 711/159; 711/160; 710/14

(58) Field of Classification Search ............... 711/134, 711/118, 133, 138, 144, 154, 156, 159–160; 710/14
See application file for complete search history.

(56) References Cited

U.S. PATENT DOCUMENTS

| 4,604,727 | A | * | 8/1986 | Shah et al. ............ 365/189.01 |
| 5,586,293 | A | * | 12/1996 | Baron et al. ............... 711/118 |
| 5,708,803 | A | * | 1/1998 | Ishimi et al. ............... 712/233 |
| 6,154,814 | A |   | 11/2000 | Uesugi |
| 6,321,318 | B1| * | 11/2001 | Baltz et al. ............... 711/170 |
| 6,347,063 | B1| * | 2/2002 | Dosaka et al. ............. 365/233 |
| 6,789,167 | B2| * | 9/2004 | Naffziger .................. 711/118 |

FOREIGN PATENT DOCUMENTS

JP 2000347932 A 12/2000

* cited by examiner

*Primary Examiner*—Matthew Kim
*Assistant Examiner*—Hetul Patel
(74) *Attorney, Agent, or Firm*—Cantor Colburn LLP

(57) ABSTRACT

A method of writing to cache including initiating a write operation to a cache. In a first operational mode, the presence or absence of a write miss is detected and if a write miss is absent, writing data to the cache and if a write miss is present, retrieving the data from a further memory and writing the data to the cache based on least recently used logic. In a second operational mode, the cache is placed in a memory mode and the data is written to the cache based on an address regardless of whether a write miss is present or absent.

14 Claims, 3 Drawing Sheets

CACHE STRUCTURE

LOGIC FOR WRITING DIRECTORY

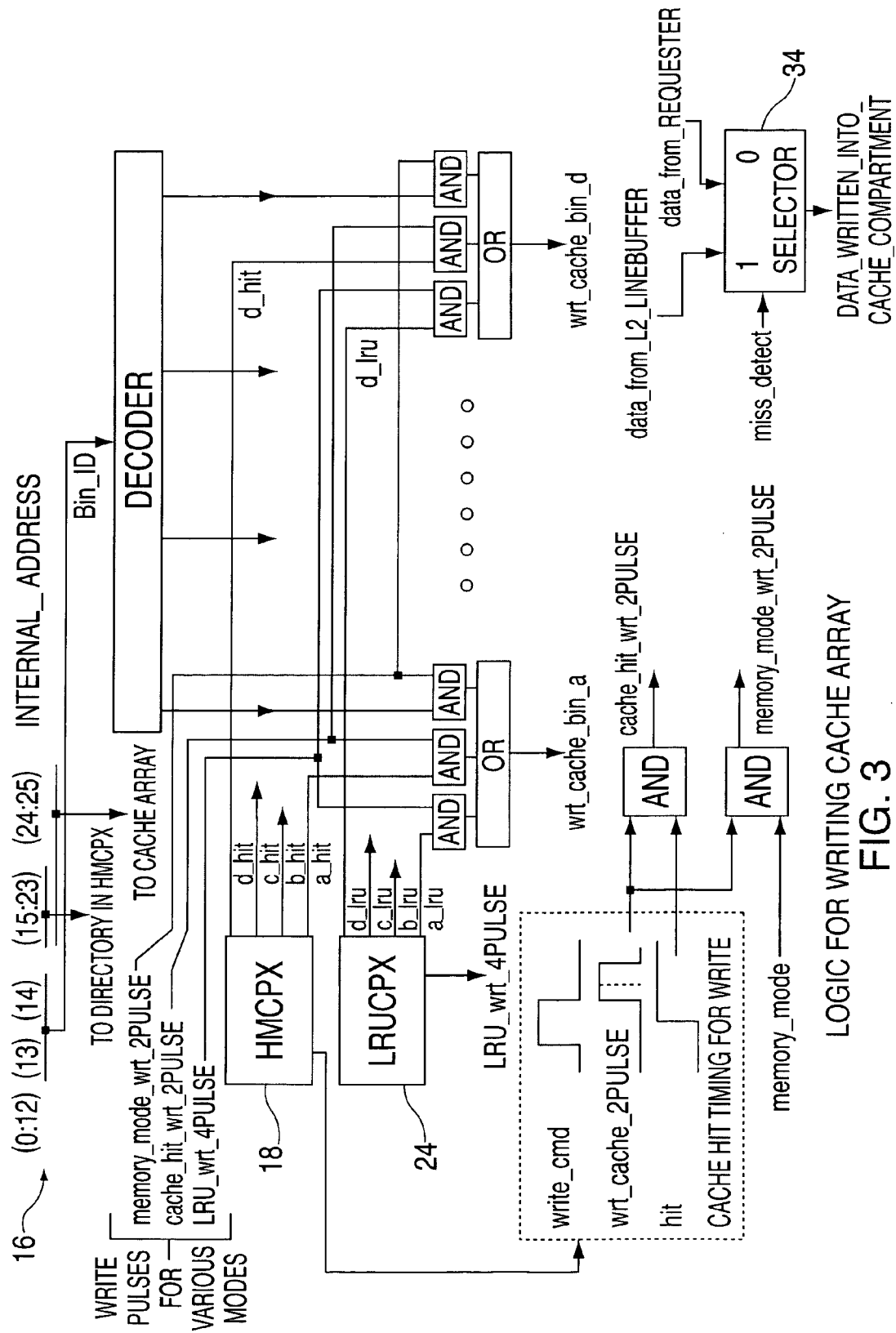

METHOD AND SYSTEM FOR PERFORMING A MEMORY-MODE WRITE TO CACHE

FIELD OF THE INVENTION

The present invention relates to accessing cache memory and in particular to a method and system for performing a memory-mode write to cache memory.

BACKGROUND OF THE INVENTION

In many computer systems, a large amount of silicon area is devoted to cache SRAM for instructions or data. In existing designs, the cache SRAM performs standard cache functions, and additional SRAM is added if any other functions are desired. Such designs experience drawbacks incurred by this extra hardware. There is need for a cache memory that operates in multiple modes to provide enhanced functionality, thereby eliminating the need for additional memory and enhancing the cache functionality.

SUMMARY OF THE INVENTION

An embodiment of the invention is a method of writing to cache including initiating a write operation to a cache. In a first operational mode, detecting the presence or absence of a write miss and if a write miss is absent, writing data to the cache and if a write miss is present, retrieving the data from a further memory and writing the data to the cache. In a second operational mode, placing the cache in a memory mode and writing the data to the cache regardless of whether a write miss is present or absent.

Another embodiment of the invention is a system of writing to cache including a cache directory and a cache array. Control logic writes a valid field and an address to the cache directory and data to the cache array. The control logic includes hit miss complex logic for determining a compartment of the cache directory and the cache array to be updated upon detecting a cache hit in a first operation mode. A least recently used (LRU) complex logic determines a compartment of the cache directory and the cache array to be updated upon detecting a cache miss in the first operational mode. The control logic determines a compartment of the cache directory and the cache array to be updated regardless of a cache hit or cache miss in a second operational mode.

BRIEF DESCRIPTION OF THE DRAWINGS

FIG. 3 depicts exemplary control logic for performing a write operation to a cache array.

DETAILED DESCRIPTION OF THE INVENTION

Embodiments of the invention include a cache controller that is able to re-use both the instruction and data L2 caches for other functions at certain times, thereby reducing hardware needed in a system. The L2 instruction and data caches may be used as static memory during normal system initialization to hold the firmware bootstrap module and work area.

The cache may be placed in memory mode based on a memory mode bit. Alternatively, the cache may dynamically change from memory mode to cache mode based on addressing. The controller for the cache is designed to respond differently to store operations when the address falls in a certain range. When the address is in the certain range, the cache is operating as a memory rather than as a cache, which is referenced as memory mode operation. Since a memory mode write updates the cache-directory with the contents of target address, subsequent load operations perform normally. When the address is outside the range, the cache operates in the manner of a conventional cache. Using memory mode, the bootstrap module can be loaded into the instruction cache as if the cache were the target of a memory store operation. When the bootstrap module is executed, it can read/write data to the instruction cache as program storage, as well as using it as a source of instructions. When the initialization phase is complete, the instruction cache naturally reverts to normal operation referenced as cache mode. This eliminates the need for the development of a special purpose hardware state machine to initialize the cache, which would not be as flexible.

Figure 1:
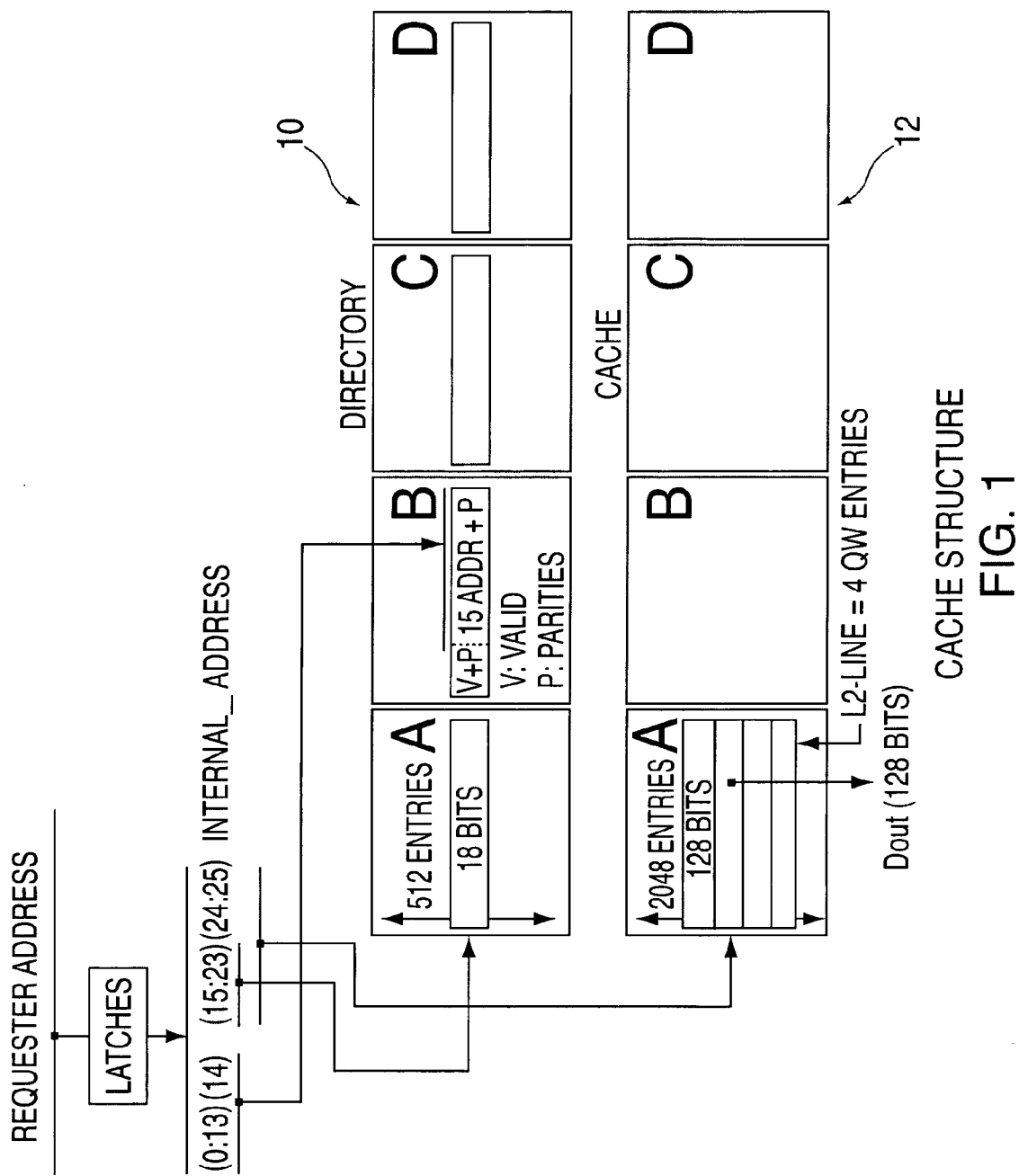
FIG. 1 depicts an exemplary cache structure.

FIG. 1 depicts an exemplary cache structure having a cache directory 10 and a cache array 12. In the embodiment shown in FIG. 1, the cache size is 128 Kbytes and includes four compartments (associativity classes). The L1 line size (data unit transferred to and from the requesting processor) is 32 Bytes. The L2 line size is 64 bytes (data unit transferred to and from L3). The bus width for data transfer is 128 bytes. Hence, it takes two cycles to transfer an L1 line and four cycles to transfer an L2 line. Each directory compartment has two fields: the valid field and the address (or tag) field. The width of the cache compartment is 128 bits (also known as a quad word) and the depth (in the word direction) of the cache array is 2048 bits, four times deeper than the directory. It is understood that other cache structure may be used, and embodiments of the invention are not limited to the cache structure shown in FIG. 1.

Figure 2:
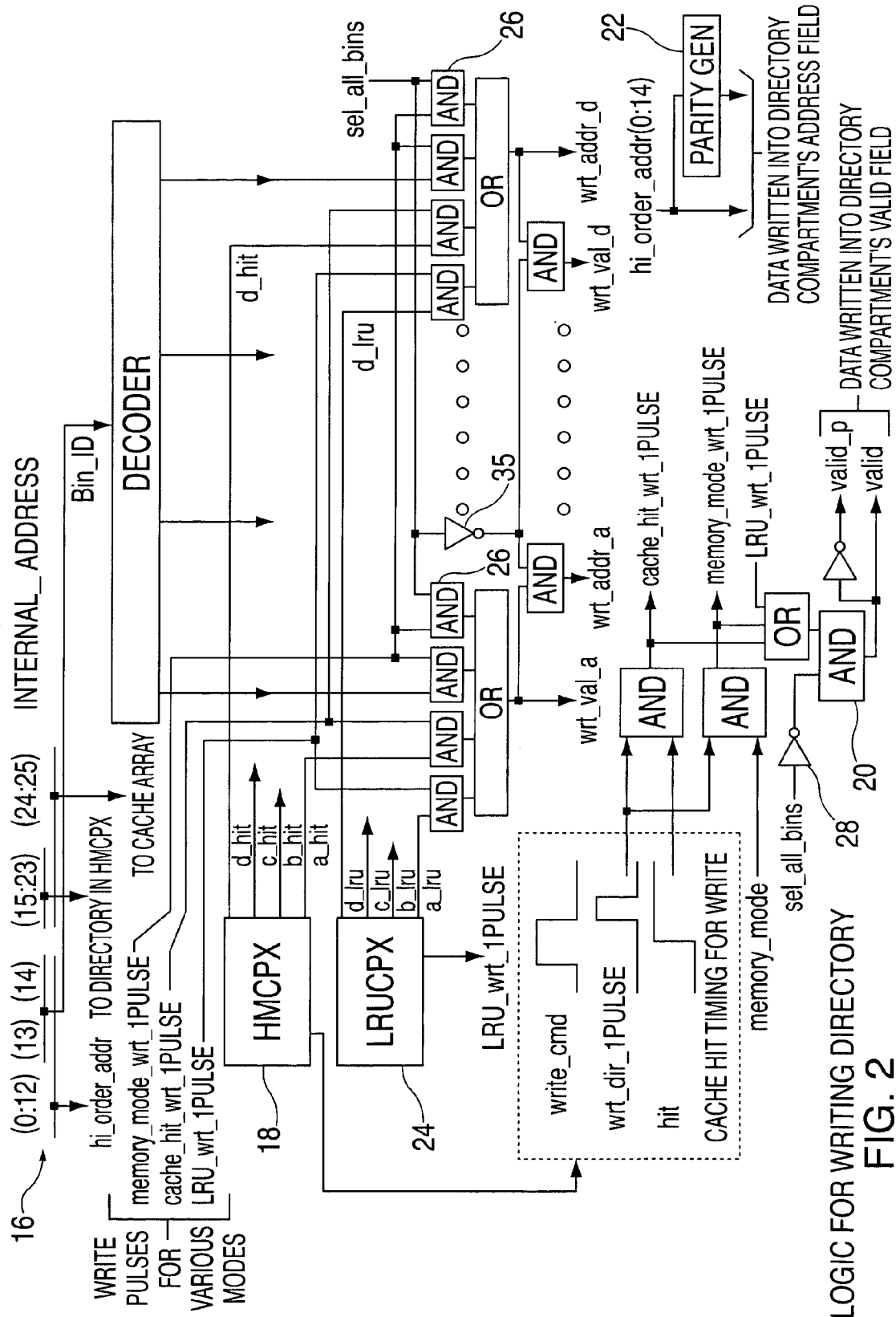
FIG. 2 depicts exemplary control logic for performing a write operation to a cache directory.

Operation of the cache in both cache mode and memory mode is described with reference to FIGS. 2 and 3. A first mode of operation is cache mode when a cache write is requested and a cache hit is detected. FIG. 2 illustrates control logic for writing to the cache directory 10 in this mode. A processor issues a cache write command to the cache. Accompanying the processor write command (shown as signal write_cmd) is the internal address 16 which is latched by the L2 cache and shown as internal_addr(0:25) in FIG. 2.

The high order bits of this latched internal address, hi_order_addr(0:14), are used by hit/miss complex logic 18 (HMCPX) together with the directory outputs to determine whether there is a hit or miss. The directory entry is pointed to by bits 15:23, internal_addr(15:23). The hit/miss complex logic 18 includes directory arrays and a group of control logic. The timing diagram for a directory hit is shown in FIG. 2. The processor issues a write command, shown as signal write_cmd. One cycle later a hit is detected by hit/miss complex logic 18. The L2 cache sends an address acknowledgment (not shown) back to the processor causing it to drop the write command signal. One cycle later a write directory pulse, shown as wrt_dir_1pulse, is high causing a cache hit write pulse, shown as cache_hit_wrt_1pulse to be active. The cache hit write pulse is asserted when there has been a hit. The notation "1pulse" is used to signify the pulse being one cycle wide.

Since there is a cache hit, one of the four compartment hit signals (shown as a_hit, b_hit, c_hit, and d_hit) will be raised and a pair of the compartment write pulses will be high to allow the valid field and the address field to be updated. For example, if compartment-A is hit, the signals write valid A (shown as wrt_val_a) and write address A (shown as wrt_addr_a) will both be high (depending on the status of a select all bins signal described in further detail herein) at the time when the cache hit write pulse is active. The write valid and write address signal are used to update the directory inside the hit/miss complex logic 18. The write valid signal updates the valid field with valid=1 and valid_p=0 at the output of gate 20 as shown in FIG. 2. The address field is updated by the write address with bits 0:14 of the internal address (shown as hi_order_addr(0:14)) plus the associated parity bit from parity generator 22. It takes one cycle to update the directory fields.

Another mode of operation is cache mode when a cache write is requested and a cache miss is detected. In the case of cache miss, none of the compartment hit signals (a_hit, b_hit, c_hit or d_hit) will be on, but one of the four least recently used (LRU) signals (shown as a_lru, b_lru, c_lru, or d_lru) will be high based on an LRU algorithm implemented by LRU complex logic 24. The LRU signal is driven by a LRU write pulse (shown as LRU_wrt_1pulse) which is active after the missed data has been brought back from L3 and stored into the L2 line buffer. The LRU write pulse and the LRU signals are generated by the LRU complex logic 24. The LRU complex logic 24 includes an LRU array, a change bit array and a group of complex control logic. Assuming the LRU complex logic 24 determines that compartment C is the least recently used one, a write valid c signal is generated which updates the valid field with valid=1 and valid_p=0. The address field is updated by write address c with bits of the internal address (shown as hi_order_addr(0:14)) plus the associated parity bit from parity generator 22. It takes one cycle to update the directory fields. The exact arrival time of the LRU write pulse is determined by the response time of L3 and the switch element between L2 and L3.

Another mode of operation is memory mode when a cache write is requested. In memory mode, the updating of directory 10 is similar to that for cache hit mode. The write valid signal and write address are driven by the memory mode write pulse, shown as memory_mode_wrt_1pulse, which is not determined by a hit signal but by a memory mode bit shown as memory_mode. This memory mode bit can be set by device control registers, an array used to store configuration information. Alternately, the memory mode bit can be determined by address bits indicating that the cache will be in memory mode only for writing into certain predetermined address space (e.g., high order address bits equal to "1111"). The timing for a memory mode write is the same as that for the cache mode write when a hit is detected. The contents with which the directory fields are update are same as the previous two cases. In the cache hit mode and cache miss mode, the compartment to be updated is determined by hit/miss complex logic 18 and the LRU complex logic 24, respectively.

In the case of a memory mode write, the compartment to be written into is determined by the address itself. The bin identifier, shown as Bin_ID corresponding to bits 13:14 of the internal address 16 designates the cache compartment to be written into. These two address bits are decoded into four control lines as shown in FIG. 2. A select all bins bit, show as sel_all_bins, is used to select all bins in the cache directory 10. When this select all bins bit is set to 1, a memory mode write will result in selecting all compartments by ignoring bin identifier because the select all bins bit is connected to all four AND gates 26 as shown in FIG. 2. The purpose of the select all bins bit is to invalidate all four compartments at the same time. When the select all bins bit is 1, the data to be written into directory valid field will be valid=0 and valid_p=1 as a result of inverter 28 and AND gate 20. Since the entries are to be invalidated, there is no point to update the address field and hence the write address signal is off by virtue of inverter 35. The select all bins function to invalidate all four compartments utilizes the memory mode logic and thus provides enhanced functionality with little or no additional logic.

FIG. 3 depicts control logic for updating the cache array 12, which is similar to updating the cache directory 10. The difference is that the rather than a one cycle write directory pulse, a two cycle write cache pulse, shown as wrt_cache_2pulse, is used. A two cycle pulse is used because the data unit (L1 line size) includes two quad-words of 128 bits which is the basic transfer unit in this design example. Also, the LRU write pulse, shown as LRU_wrt_4pulse is a four cycle wide pulse because it takes four transfers to load an L2 line into the cache array in the event of miss. For a cache hit write or memory mode write, the data to be written in the cache array is supplied by the processor, the requester. For a cache miss write, the data to be written into the cache array is from the L2 line buffer which has been loaded with the data from L3. The data source selection is done by the miss detection signal, shown as miss_detect, applied to a data selector 34. When the select all bins bit is 1, the cache array needs no updating in memory mode because the directory entries are to be invalidated anyway. Cache array congruence is determined by bits 15:25 of internal address 16, internal_addr(15:25) and bin identifier determined by bits 13:14 of internal address 16, internal_addr(13:14) bits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method of writing to cache comprising:
    initiating a write operation to a cache;
    in a cache mode:
        detecting the presence or absence of a write miss;
        if a write miss is absent, writing data to said cache;
        if a write miss is present, retrieving said data from a further memory and writing said data to said cache;
    in a memory mode:
        placing said cache in a memory mode for performing a cache write, said placing said cache in the memory mode including setting a memory mode bit, the memory mode bit logically combined with a write directory pulse to generate a memory mode write pulse;
        writing said data to said cache regardless of whether a write miss is present or absent to update a cache directory with the contents of a target address, said writing said data including a logical operation of the memory mode write pulse and a cache hit write pulse, wherein in the absence of a cache hit write pulse, said data is written to said cache in the presence of said memory mode write pulse.

2. The method of claim 1 wherein:
said memory mode is designated by a memory mode bit.

3. The method of claim 2 wherein:
said memory mode bit is stored in a device control register.

4. The method of claim 1 wherein:
said initiating a write operation includes specifying an address;
said memory mode is designated by address bits contained within said address.

5. The method of claim 4 wherein:
said by address bits contained within said address include the high order address bits equaling 1111.

6. The method of claim 1 wherein:
said initiating a write operation includes specifying an address;
said memory mode includes retrieving a bin identifier from said address, said bin identifier designating a compartment of said cache where said data is to be written.

7. The method of claim 1 wherein:
said memory mode includes setting a select all bins bit to invalidates cache directory entries associated with writing said data.

8. A system of writing to cache comprising:
a cache directory;
a cache array;
control logic for writing a valid field and an address to said cache directory and data to said cache array, said control logic including:
  hit miss complex logic for determining a compartment of said cache directory and said cache array to be updated upon detecting a cache hit in a first operation mode;
  least recently used (LRU) complex logic for determining a compartment of said cache directory and said cache array to be updated upon detecting a cache miss in said first operational mode, the determining being based on an LRU algorithm;
said control logic determining a compartment of said cache directory and said cache array to be updated regardless of a cache hit or cache miss in a second operational mode for performing a cache write to update the cache directory with the contents of a target address;
said control logic placing said cache in said second operational mode by setting a memory mode bit, the memory mode bit logically combined with a write directory pulse to generate a memory mode write pulse;
said control logic performing a logical operation of the memory mode write pulse and a cache hit write pulse, wherein in the absence of a cache hit write pulse, said data is written to said cache in the presence of said memory mode write pulse.

9. The system of claim 8 wherein:
said second operational mode is designated by a memory mode bit.

10. The system of claim 9 further comprising:
a device control register storing said memory mode bit.

11. The system of claim 8 wherein:
said second operational mode is designated by address bits contained within said address.

12. The system of claim 11 wherein:
said address bits contained within said address include the high order address bits equaling 1111.

13. The system of claim 8 wherein:
said control logic retrieves a bin identifier from said address, said bin identifier designating said compartment of said cache where said data is to be written.

14. The system of claim 8 wherein:
said control logic invalidates cache directory entries associated with writing said data in response to a select all bins bit.

* * * * *